US008619547B2

(12) United States Patent
Qiu et al.

(10) Patent No.: US 8,619,547 B2
(45) Date of Patent: Dec. 31, 2013

(54) COMMUNICATION SYSTEM WITH FAILOVER COMMUNICATION SERVICES

(75) Inventors: Chaoxin Qiu, Austin, TX (US); Arshad Khan, Austin, TX (US); Niral Sheth, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 297 days.

(21) Appl. No.: 12/943,457

(22) Filed: Nov. 10, 2010

(65) Prior Publication Data

US 2012/0113796 A1 May 10, 2012

(51) Int. Cl.
H04J 1/16 (2006.01)
H04J 3/14 (2006.01)
H04L 12/26 (2006.01)

(52) U.S. Cl.
USPC .............................................. 370/216; 714/2

(58) Field of Classification Search
USPC ...................................... 370/216, 329; 714/2
See application file for complete search history.

(56) References Cited

U.S. PATENT DOCUMENTS 8,028,192 B1 *  9/2011  Kekre et al. ...................... 714/13
8,194,628 B2 *  6/2012  Ku .................................. 370/338
8,251,287 B2 *  8/2012  Kochevar ....................... 235/382
2007/0036312 A1 *  2/2007  Cai et al. ........................ 379/126
2008/0212569 A1 *  9/2008  Terrill et al. ................... 370/352
2008/0247396 A1  10/2008  Hazard
2009/0077413 A1  3/2009  Dake
2009/0268720 A1 *  10/2009  Veenstra et al. ............... 370/352
2010/0034194 A1 *  2/2010  Fieremans et al. ............. 370/352
2010/0039930 A1  2/2010  Liang
2010/0039945 A1 *  2/2010  Ito ................................... 370/242
2010/0208671 A1 *  8/2010  Tamura et al. ................. 370/329
2010/0287406 A1 *  11/2010  Ishii ................................... 714/4
2011/0110223 A1 *  5/2011  Dutta et al. .................... 370/221
2011/0252141 A1 *  10/2011  Boberg et al. ................. 709/226
2012/0195414 A1 *  8/2012  Yang et al. ................... 379/93.14

* cited by examiner

*Primary Examiner* — Michael Thier
*Assistant Examiner* — Brian Cox
(74) *Attorney, Agent, or Firm* — Guntin & Gust, PLC; Jay H. Anderson

(57) ABSTRACT

A system may include, for example, an Interrogating Call Session Control Function (I-CSCF) device having a processor adapted to receive a request from a Serving CSCF (S-CSCF) device communicatively coupled to a first communication device to establish communications with a second communication device responsive to the first communication device initiating a call directed to the second communication device, and to identify a primary S-CSCF device to which the second communication device is registered. The processor can also be adapted to detect a communication fault when attempting to communicate with the primary S-CSCF device, and to identify a secondary S-CSCF device that provides backup communication services to the second communication device responsive to detecting the communication fault. Other embodiments are disclosed.

25 Claims, 6 Drawing Sheets

100

700

100% # COMMUNICATION SYSTEM WITH FAILOVER COMMUNICATION SERVICES

FIELD OF THE DISCLOSURE

The present disclosure relates generally to fault resilience design in communication services.

BACKGROUND

In packet-switched communication systems, such as an Internet Protocol Multimedia Subsystem (IMS) network, it may be common for millions of communication devices to register with a server office of the IMS network. When a server office fails to provide services due to a catastrophic event such as an earthquake or other unexpected event, the communication devices may overload the IMS network with registration requests that could adversely affect the performance of the IMS network.

DETAILED DESCRIPTION

Figure 1:
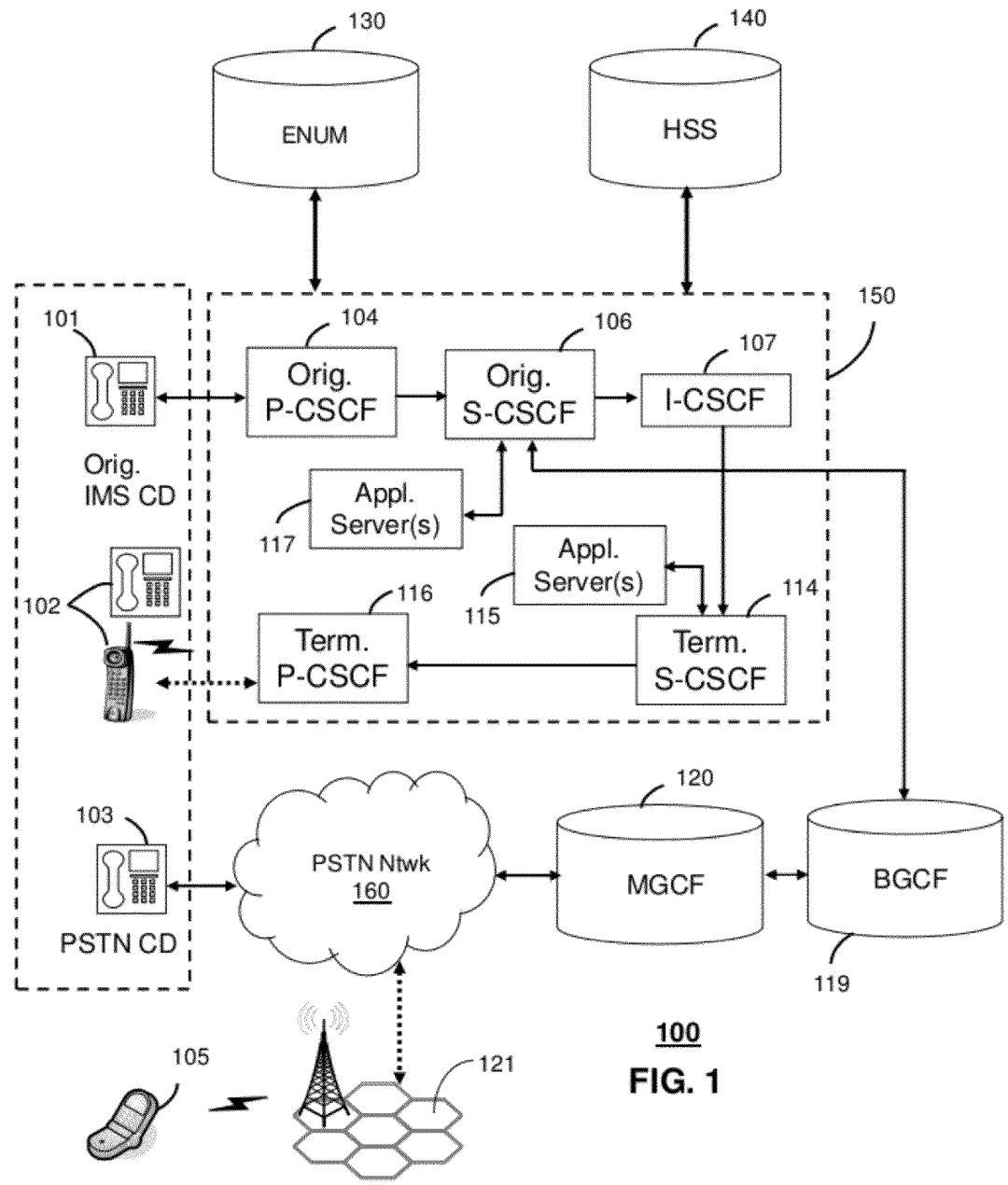
FIGS. 1-2 depict illustrative embodiments of communication systems.

The present disclosure describes, among other things, illustrative embodiments to avoid excessive re-registration requests initiated by communication devices due to a communication fault in an IMS network supplying communication services to a large population of communication devices. Other embodiments are contemplated by the present disclosure.

One embodiment of the present disclosure describes a primary Serving Call Session Control Function (S-CSCF) device that is communicatively coupled to one or more primary application servers. The primary S-CSCF device and the one or more primary application servers can operate collectively as a primary communication resource available to a communication device communicatively coupled to an Internet Protocol Multimedia Subsystem (IMS) network. The primary S-CSCF device may include a processor that is adapted to receive a registration request originated by the communication device. The processor is further adapted to obtain a subscription profile associated with the communication device. The processor can also be adapted to transmit one or more registration messages destined for the one or more primary application servers according to the subscription profile, and to identify a secondary S-CSCF device that is communicatively coupled to one or more secondary application servers. The secondary S-CSCF device and the one or more secondary application servers can operate collectively as a secondary communication resource available to the communication device when a communication fault causes the primary communication resource to be unavailable. The processor can also be adapted to transmit registration information associated with the communication device to the secondary S-CSCF device.

One embodiment of the present disclosure includes a Proxy Call Session Control Function having a processor adapted to receive a registration request from a communication device, and to transmit the registration request to a primary S-CSCF device communicatively coupled to one or more primary application servers. The primary S-CSCF device and the one or more primary application servers can operate collectively as a primary communication resource for the communication device. The processor can also be adapted to detect a communication fault in the primary communication resource, and to establish one or more communication services with a secondary communication resource responsive to the detected communication fault. The primary S-CSCF device can be operable to transmit registration information associated with the communication device to a secondary S-CSCF device communicatively coupled to one or more secondary application servers. The secondary S-CSCF device and the one or more secondary application servers can operate collectively as the secondary communication resource for providing backup communication services.

One embodiment of the present disclosure includes an Interrogating Call Session Control Function (I-CSCF) device having a processor adapted to receive a request from an S-CSCF device, BGCF or MGCF (as defined below) communicatively coupled to a first communication device to establish communications with a second communication device responsive to the first communication device initiating a call directed to the second communication device, and to identify a primary S-CSCF device to which the second communication device is registered. The processor can also be adapted to detect a communication fault when attempting to communicate with the primary S-CSCF device, and to identify a secondary S-CSCF device that provides backup communication services to the second communication device responsive to detecting the communication fault.

For illustration purposes only, the terms S-CSCF device, P-CSCF device, I-CSCF device, and so on, will be used without the word "device." It is, however, understood that any form of a CSCF operates in a device, system, component, or other form of centralized or distributed hardware and software.

FIG. 1 depicts an illustrative embodiment of a communication system 100 employing an Internet Protocol Multimedia Subsystem (IMS) network architecture to facilitate the combined services of circuit-switched and packet-switched communication systems. Communication system 100 can comprise a Home Subscriber Server (HSS) 140, a tElephone NUmber Mapping (ENUM) server 130, and other common network elements of an IMS network 150. The IMS network 150 can establish communications between IMS-compliant communication devices (CDs) 101, 102, Public Switched Telephone Network (PSTN) CDs 103, 105, and combinations thereof by way of a Media Gateway Control Function (MGCF) 120 coupled to a PSTN network 160. The MGCF 120 need not be used when a communication session involves IMS CD to IMS CD communications. A communication session involving at least one PSTN CD may utilize the MGCF 120.

IMS CDs 101, 102 can register with the IMS network 150 by contacting a Proxy Call Session Control Function (P-CSCF) which communicates with an interrogating CSCF, which in turn, communicates with a Serving CSCF (S-CSCF) to register the CDs with the HSS 140. To initiate a communication session between CDs, an originating IMS CD 101 can submit a Session Initiation Protocol (SIP INVITE) message to an originating P-CSCF 104 which communicates with a corresponding originating S-CSCF 106. The originating S-CSCF 106 can submit the SIP INVITE message to one or more application servers (AS) 117 that can provide a variety of services to IMS subscribers.

For example, the application servers 117 can be used to perform originating call feature treatment functions on the calling party number received by the originating S-CSCF 106 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 106 can submit queries to the ENUM system 130 to translate an E.164 telephone number in the SIP INVITE message to a SIP Uniform Resource Identifier (URI) if the terminating communication device is IMS-compliant. The SIP URI can be used by an Interrogating CSCF (I-CSCF) 107 to submit a query to the HSS 140 to identify a terminating S-CSCF 114 associated with a terminating IMS CD such as reference 102. Once identified, the I-CSCF 107 can submit the SIP INVITE message to the terminating S-CSCF 114. The terminating S-CSCF 114 can then identify a terminating P-CSCF 116 associated with the terminating CD 102. The P-CSCF 116 may then signal the CD 102 to establish Voice over Internet Protocol (VoIP) communication services, thereby enabling the calling and called parties to engage in voice and/or data communications. Based on the iFCs in the subscriber profile, one or more terminating application servers 115 may be invoked to provide various call terminating feature services, such as call forwarding no answer, do not disturb, music tones, simultaneous ringing, sequential ringing, etc.

In some instances the aforementioned communication process is symmetrical. Accordingly, the terms "originating" and "terminating" in FIG. 1 may be interchangeable. It is further noted that the communication system 100 can be adapted to support video conferencing. It is further contemplated that the CDs of FIG. 1 can operate as wireline or wireless devices. The CDs of FIG. 1 can be communicatively coupled to a cellular base station 121, a femtocell (not shown), a WiFi router, a DECT base unit, or another suitable wireless access unit to establish communications with the IMS network 150 of FIG. 1.

If the terminating communication device is instead a PSTN CD such as CD 103 or CD 105 (in instances where the cellular phone only supports circuit-switched voice communications), the ENUM system 130 can respond with an unsuccessful address resolution which can cause the originating S-CSCF 106 to forward the call to the MGCF 120 via a Breakout Gateway Control Function (BGCF) 119. The MGCF 120 can then initiate the call to the terminating PSTN CD over the PSTN network 160 to enable the calling and called parties to engage in voice and/or data communications.

The cellular access base station 121 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the present disclosure. Multiple wireline and wireless communication technologies are therefore contemplated for the CDs of FIG. 1.

It is further contemplated that cellular phones supporting LTE can support packet-switched voice and packet-switched data communications and thus may operate as IMS-compliant devices. In this embodiment, the cellular base station 121 may communicate directly with the IMS network 150.

Figure 2:
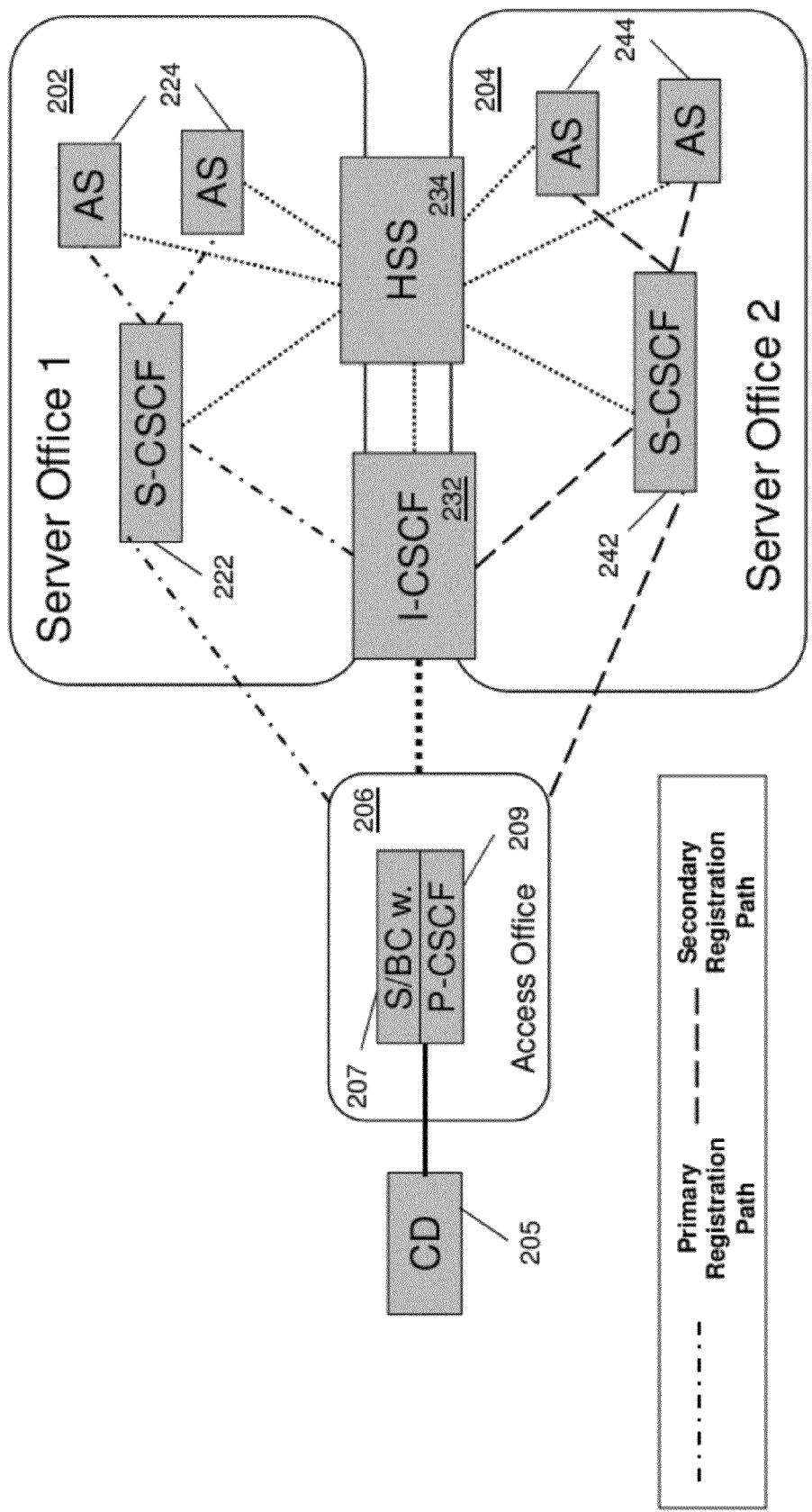

The IMS network 150 of FIG. 1 represents a single instance of network elements commonly utilized for end-to-end communications. In practice, however, there can be many instances of the IMS network elements shown in FIG. 1. Several instances of, for example, S-CSCF's and application servers can be clustered into a server office which provides communication services to perhaps millions of subscribers. The P-CSCF's can also be clustered in access offices with session border controllers (not shown in FIG. 1). FIG. 2 illustrates first and second server offices. A communication device can gain access to either of server offices 202 or 204 by way of a session border controller and P-CSCF pair. One or more instances of I-CSCF and HSS can also be accessed by the network elements of either of server offices 202 and 204, or the access office 206 as shown by the dotted lines.

Referring back to FIG. 1, the P-CSCFs 104 and 116 and the S-CSCFs 106 and 114 can be adapted to avoid excessive failover re-registrations resulting from communication faults in the IMS network 150 as will be described in illustrative embodiments of the methods described in FIGS. 3-6.

Referring to FIG. 2, each of server offices 202 and 204 can provide communication services to CD 205 by way of a session border controller (S/BC) 207 and a P-CSCF 209 located at an access office 206. As will be described by the methods of FIGS. 3-6, server office 202 can serve as a primary communication resource for serving the communication needs of CD 205. CD 205 registers with the server office 202 as described earlier in FIG. 1. Server office 204 may serve as a secondary communication resource to CD 205 when an unrecoverable or serious fault is detected at server office 202 as will be described by the methods of FIGS. 3-6 supported by the flow diagram of FIG. 7.

Figure 3:
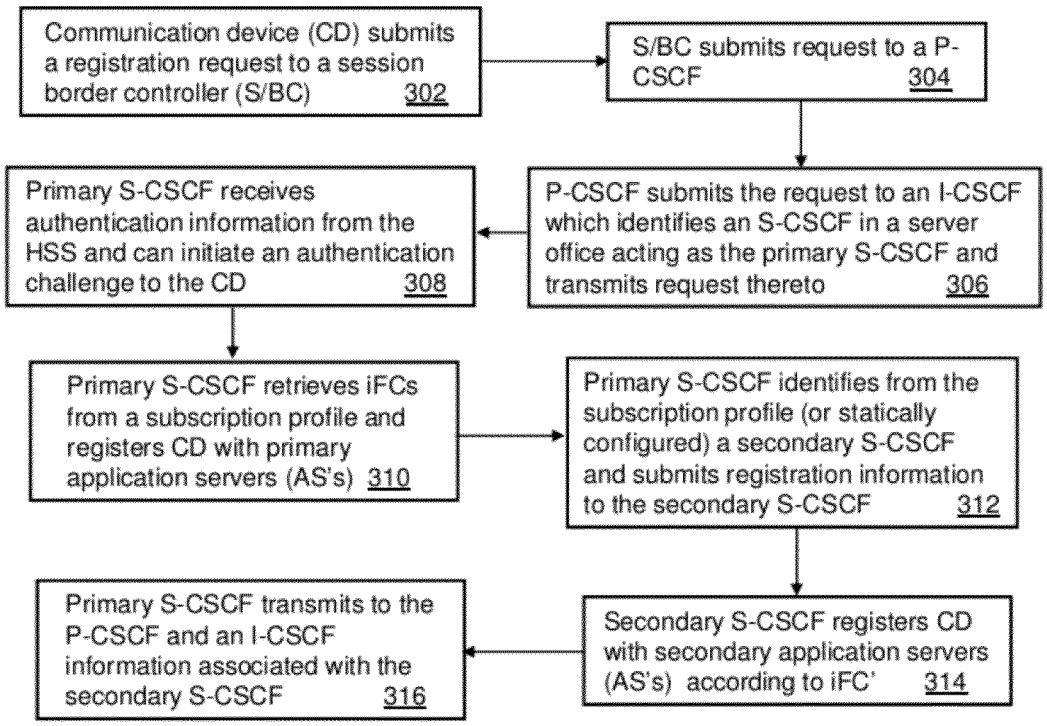
FIG. 3-6 depict illustrative embodiments of methods operating in portions of the systems described in FIGS. 1-2.
Figure 7:
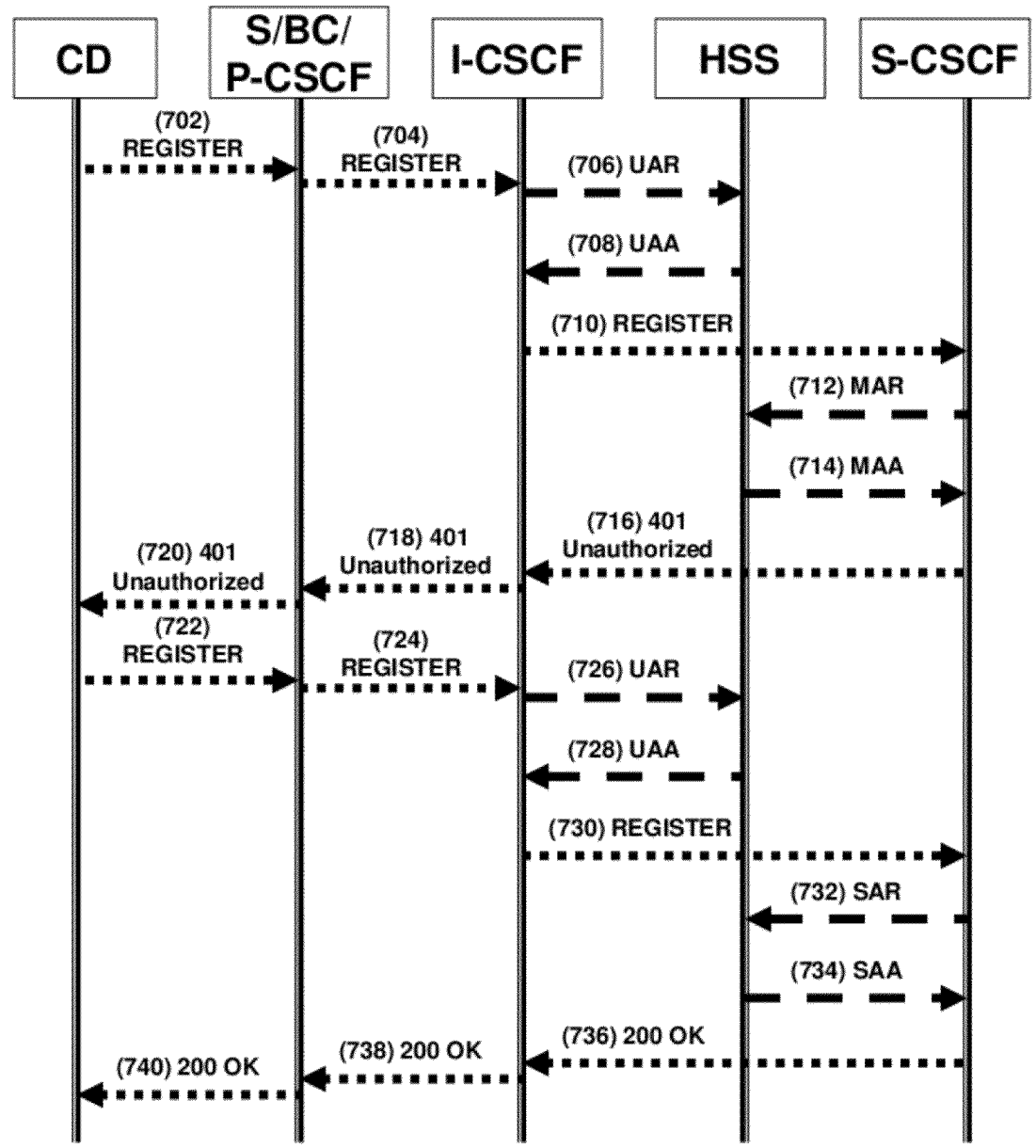
FIG. 7 depicts an illustrative embodiment of a flow diagram.

Referring to FIG. 3 as supported by the signal flow diagram of FIG. 7, method 300 can begin with 302 in which a communication device such as the CD 205 of FIG. 2 submits a registration request to access office 206. The S/BC 207 submits, at 304, the request to the P-CSCF 209 of access office 206. The culmination of this process is shown at step 702 of FIG. 7. At 306, the P-CSCF 209 submits the registration request to an I-CSCF 232 which transmits to the HSS 234 a DIAMETER command in the form of a user authorization request (UAR), at 706. The HSS 234 can in turn reply with DIAMETER command in the form of a user authorization answer (UAA), at 708, which provides guidelines to the I-CSCF 232 for choosing the S-CSCF 222 in server office 202. At 710, the I-CSCF 232 transmits the registration request to the S-CSCF 222 at server office 202. It should be noted that the server office 202 can have several S-CSCFs other than the S-CSCF 222 shown in FIG. 2. Accordingly, a different S-CSCF may be selected according to the registration behavior of the CD 205.

For this example, the S-CSCF 222 of server office 202 will be regarded as the primary S-CSCF 222 since it is the S-CSCF to which the P-CSCF 209 of access office 206 would normally use for registrations and call originations or terminations for CD 205. Upon receiving the registration request, the primary S-CSCF 222 can retrieve at 308 from the HSS 234 (or another network element of the IMS network 200) authentication information associated with the CD 205. This step can be accomplished by the primary S-CSCF 222 of server office 202 transmitting to the HSS 234 a multimedia authentication request (MAR) DIAMETER command, at 712, of FIG. 7. The HSS 234 can in turn reply, at 714, with a multimedia authentication answer (MAA) that includes the authentication information.

At 308, the primary S-CSCF 222 can transmit the authentication challenge to the CD 205 as depicted by steps 716 through 720. The authentication challenge can force the CD 205 to submit credentials in a new registration message as depicted at steps 722 through 730. In this registration process, the CD 205 provides the primary S-CSCF 222 authentication data with the registration message. The primary S-CSCF 222 can compare this information to authentication data supplied by the HSS 234 to validate the CD 205.

If the authentication succeeds, the primary S-CSCF 222 can proceed to 310 where it retrieves a subscription profile associated with the CD 205. The primary S-CSCF 222 can accomplish this by transmitting to the HSS 234, at 732, a server assignment request (SAR) DIAMETER command. The HSS 234 can respond, at 734, with a server assignment (SAA) DIAMETER command which includes the subscription profile. The primary S-CSCF 222 can then notify the CD 205 that it is registered with the IMS network 200 as depicted at steps 736 through 740.

The subscription profile can include one or more initial filter criteria (iFCs) which can be used to provision the application servers 224 of server office 202 (which will be referred to as primary application servers 224 in what follows). iFCs can be used for providing call origination features such as caller ID blocking, call barring, 7-digit dialing, and so on as described for FIG. 1. Each iFC can have two URIs, one that points to the primary application server 224 associated with the iFC, and another that points to the secondary application server 244 associated with the same iFC for backup communication services as will be described below.

At 310, the primary S-CSCF 222 can retrieve the iFCs from the subscription profile and register the CD 205 with the primary application servers 224 of server office 202. Once the registration process has been completed for the CD 205 at server office 202, the primary S-CSCF 222 can identify from its system configuration its secondary S-CSCF 242 in a remote server office 204 which can provide backup communication servers to the CD 205.

The determination of which S-CSCF of which server office 204 will provide backup services can be configured in the IMS network 200, notably in all P-CSCFs, I-CSCFs and S-CSCFs. Each P-CSCF and I-CSCF can be configured with a table of S-CSCFs and their companion secondary S-CSCFs, respectively. Additionally, each S-CSCF can be configured with the information of its remote secondary S-CSCF. In one embodiment, each application server can also be configured with information that identifies a remote secondary application server which provides backup services. In another embodiment, the primary and secondary application servers can be identified in the iFCs of the CD 205, which can provide more flexibility to manage the IMS network 200 of FIG. 2.

The selection of server office 204 as a backup communication service can be based on the geographic disparity between server offices 202 and 204 or other criteria (such as load balancing, bandwidth utilization, etc.) suitable to meeting the service provider's business or technical objectives. Once the primary S-CSCF 222 identifies the secondary S-CSCF 242, the primary S-CSCF 222 can transmit at 312 registration information to the secondary S-CSCF 242. The registration information can comprise the subscription profile of the CD 205, the iFCs, or derivatives thereof. At 314, the secondary S-CSCF 242 can register the CD 205 with the secondary application servers 244 of server office 204 according to the iFCs by way of a third party registration process used in IMS networks.

At 316, the primary S-CSCF 222 can also transmit to the P-CSCF 209 of access office 206 and an I-CSCF 232 associated with the primary S-CSCF 222 information describing the secondary S-CSCF of server office 204. Alternatively, each of the P-CSCF 209 and the I-CSCF 232 can be pre-provisioned to identify primary and secondary server offices 202 and 204 and their respective S-CSCF and application server pairs, thereby avoiding the need for step 316. As a result, the P-CSCF 209 and the I-CSCF 232 may be provided with information to respond to an unrecoverable communication fault that is detected at server office 202 as will be described further below.

Figure 4:
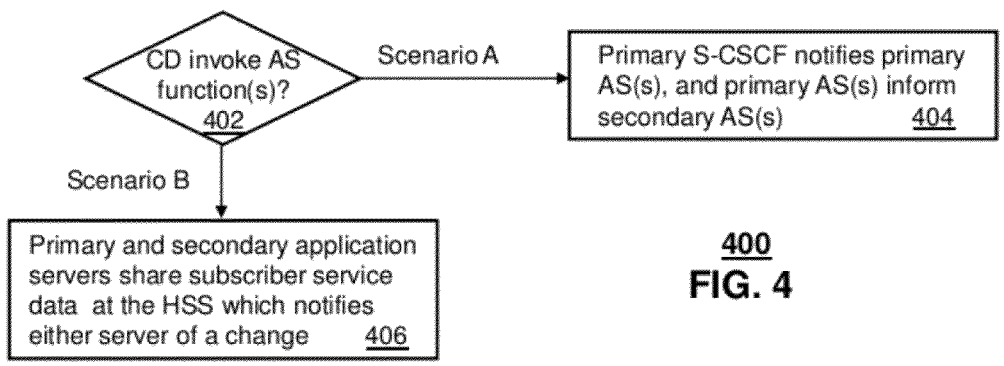

Referring to FIG. 4, method 400 describes how the primary and secondary application servers 224 and 244 of server offices 202 and 204 can be kept synchronized as a user of the CD 205 invokes application server functions such as call forwarding. If an application server function is invoked at step 402, two embodiments can be used to service an application server function request (e.g., *72). The SIP message transmitted by the CD 205 and received by the primary S-CSCF 222 from access office 206 can be directed at 404 to the primary application server(s) 224 of server office 202. If the application server feature invoked by the CD 205 is a static feature (e.g., call forwarding), then the affected primary application server(s) 224 can in turn inform the secondary application server(s) 244 of the change at server office 204. The primary application server(s) 224 of server office 202 can identify the secondary application server(s) 244 according to the URI's provided in the iFC.

In yet another embodiment, application servers can store their subscriber service data in the HSS 234 (to differentiate from other subscriber profiles that are mandatory in the HSS 234). Application servers can also subscribe to the HSS 234 to get notification from the HSS if part of the subscriber service data is changed. To remain synchronous between the primary and secondary application servers 224 and 244 of server offices 202 and 204, both primary and secondary application servers 224 and 244 can share, at 406, their subscriber service data in the HSS 234 and both can subscribe to the HSS 234 to receive notifications of any changes to the shared subscriber service data. Accordingly, if the CD 205 invokes a change to the subscriber service data of the primary application servers 224, the HSS 234 can be adapted to notify the secondary application servers 244 of the change, which results in an update that maintains the primary and secondary applicator servers 244 synchronized. It will be appreciated by one of ordinary skill in the art that information can be shared between the primary and secondary application servers 224 and 244 by utilizing any storage device in the IMS network 200 that can be configured to store setting in the primary or secondary application servers 224 and 244.

Figure 5:
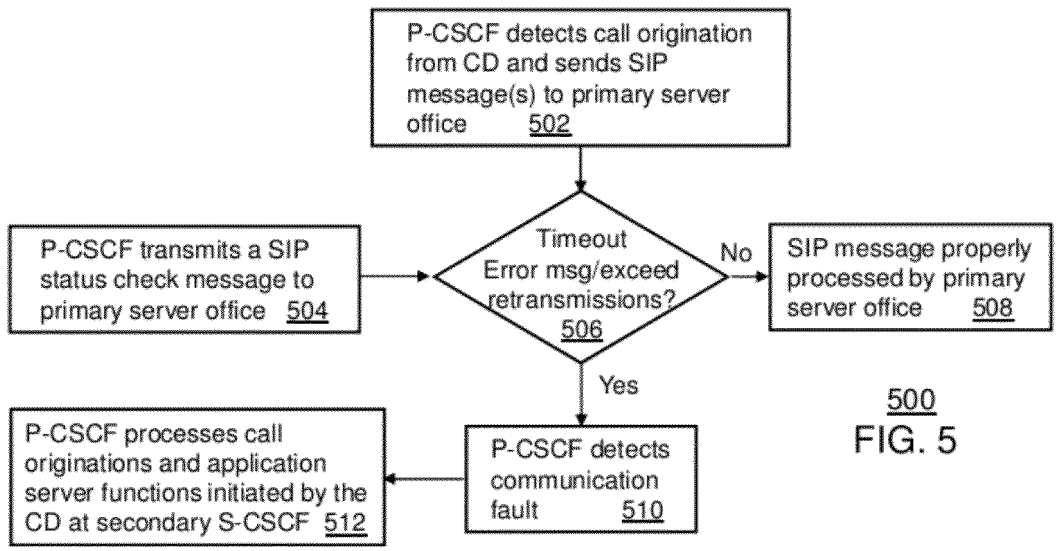

Referring to FIG. 5, method 500 describes illustrative embodiments in which the P-CSCF 209 of access office 206 switches to the secondary S-CSCF 242 of server office 204. At 502, the P-CSCF 209 can detect a call origination initiated by the CD 205 at access office 206. In response, the P-CSCF 209 can transmit a SIP INVITE message as previously described for FIG. 1 to the primary S-CSCF 222 for processing. If the primary S-CSCF 222 is operating properly, it will process the SIP INVITE message, at 508, and establish a call with a termination communication device as previously described in FIG. 1. If, however, the primary S-CSCF 222 or other network elements such as, for example, the primary application servers 224 in server office 202 are malfunctioning or unavailable and the P-CSCF 209 of access office 206 fails to detect, at 506, a response within a timeout period established by the service provider, the P-CSCF 209 can attempt a retransmission of the SIP INVITE message. If a response timeout is encountered again, at 506, and the number of retransmissions exceeds a predetermined threshold set by the service provider, then the P-CSCF 209 can proceed to 510 where it identifies a communication fault, establishes communications with the secondary S-CSCF 242, and processes future call originations from the CD 205 at the secondary S-CSCF 242. A P-CSCF 209 can decide that a primary S-CSCF 222 is not available for service if the primary S-CSCF 222 does not respond to SIP requests from the P-CSCF 209 or it receives a SIP 408 or 503 error message, at 506, to indicate system level faults for other communication resources such as the primary application servers 224.

To detect communication faults early, the P-CSCF 209 can submit, at 504, SIP status check messages to the primary S-CSCF 222. If no response is detected after the timeout period and retransmissions have exceeded an established threshold, then the P-CSCF 209 can proceed to 510 and 512 as previously described. An I-CSCF 232 can decide that a primary S-CSCF 222 is not available for service if the primary S-CSCF 222 does not respond to SIP requests from the I-CSCF 232 or it receives a SIP 408 or 503 error to indicate system level faults for other communication resources such as the primary application servers 224.

Figure 6:
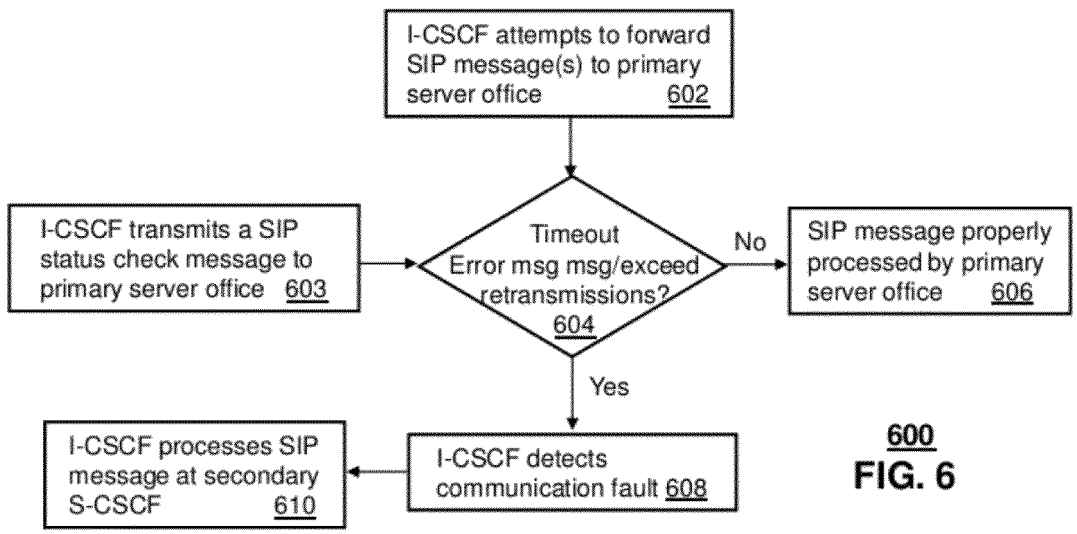

Referring to FIG. 6, method 600 describes illustrative embodiments in which the I-CSCF of FIGS. 1-2 resorts to utilizing a second communication resource when an unrecoverable or serious communication fault is detected at a server office. At 602, the I-CSCF can receive a call origination SIP message from an originating S-CSCF as previously described for FIG. 1. The I-CSCF can receive from the HSS an identification of the terminating S-CSCF. In one embodiment, communications between the I-CSCF and the terminating S-CSCF can be successful in reaching the terminating communication device as was described for FIG. 1. This embodiment is represented at 606.

If, however, the I-CSCF attempts to communicate with the terminating S-CSCF and no response is detected after the timeout period, or an error message such as SIP 408 or 503 is detected at 604 and retransmissions have exceeded an established threshold, then the I-CSCF can proceed to 608 where it determines an unrecoverable or serious communication fault has occurred and it proceeds to 610 where it establishes communications with a secondary S-CSCF and completes the call from the server office of the secondary S-CSCF. Step 610 can occur as a result of the terminating S-CSCF (operating as a primary S-CSCF) having previously informed the P-CSCF and the I-CSCF of which server office has a secondary S-CSCF which will provide backup services in the event of a communication fault (see step 316 of FIG. 3). At 603, the I-CSCF can also be adapted to transmit status check messages to the primary S-CSCF. If no response is received within a timeout period at 604, and retransmission attempts have exceeded a threshold set by the service provider, then the I-CSCF can resort to utilizing the secondary S-CSCF as described by steps 608, 610.

Similarly, the P-CSCF associated with the terminating communication device can detect that the terminating S-CSCF is malfunctioning (e.g., see steps 504, 506, 510, and 512) and switch to the secondary S-CSCF as described earlier. Thus when the I-CSCF switches to the secondary S-CSCF it has access to the terminating communication device.

Figure 8:
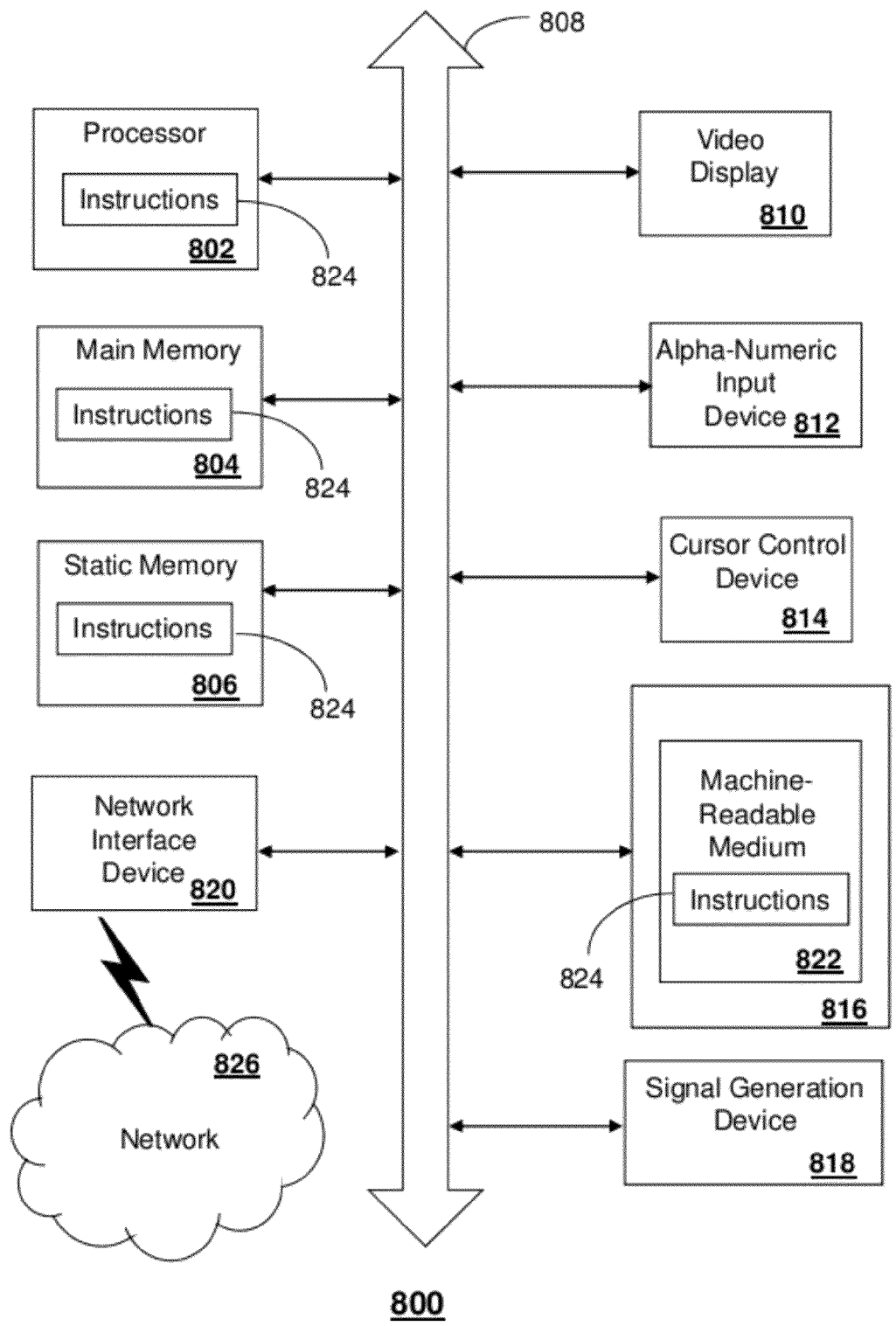
FIG. 8 is a diagrammatic representation of a machine in the form of a computer system within which a set of instructions, when executed, may cause the machine to perform any one or more of the methods discussed herein.

FIG. 8 depicts an exemplary diagrammatic representation of a machine in the form of a computer system 800 within which a set of instructions, when executed, may cause the machine to perform any one or more of the methods discussed above. One or more instances of the machine can operate, for example, as the CDs and the network elements of the IMS networks shown in FIGS. 1-2 as described above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a non-transitory machine-readable medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over a network 826 using the instructions 824. The instructions 824 may further be transmitted or received over the network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methods of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; and a magneto-optical or optical medium such as a disk or tape. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA) are contemplated for use by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A primary serving call session control function device comprising:
    a memory to store instructions, and
    a processor coupled to the memory,
    wherein the primary serving call session control function device is communicatively coupled to a primary application server,
    wherein the primary serving call session control function device and the primary application server operate collectively as a primary communication resource available to a communication device communicatively coupled to an internet protocol multimedia subsystem network, and
    wherein the processor, responsive to executing the instructions, performs operations comprising:
        receiving a registration request originated by the communication device;
        obtaining a subscription profile associated with the communication device;
        transmitting a registration message destined for the primary application server according to the subscription profile;
        identifying a secondary serving call session control function device communicatively coupled to a secondary application server; and
        transmitting registration information associated with the communication device to the secondary serving call session control function device,
    wherein the secondary serving call session control function device and the secondary application server operate collectively as a secondary communication resource available to the communication device to complete a call when a subsequent communication fault causes the primary communication resource to be unavailable, the secondary communication resource being available to the communication device prior to and separate from detection of the communication fault, wherein registration of the communication device with the secondary serving call session control function device is completed prior to detection of the communication fault.

2. The primary serving call session control function device of claim 1, wherein the secondary serving call session control function device transmits the registration message to the secondary application server according to the registration information provided by the primary serving call session control function device,
    wherein the communication device submits the registration request to a session border controller communicatively coupled to a proxy call session control function device, and
    wherein the proxy call session control function device transmits the registration request to an interrogating call session control function device during initial registration operations or to the primary serving call session control function device during a re-registration.

3. The primary serving call session controller function device of claim 1, wherein the subscription profile includes initial filter criteria, and wherein each of the initial filter criteria comprises a primary uniform resource identifier associated with the primary application server and a secondary uniform resource identifier associated with the secondary application server.

4. The primary serving call session control function device of claim 3, wherein the registration information transmitted to the secondary serving call session control function device comprises the initial filter criteria.

5. The primary serving call session control function device of claim 1, wherein the processor further performs operations comprising:
receiving a session initiation protocol message generated by the communication device; and
transmitting the session initiation protocol message to the primary application server to enable an application service feature, wherein the primary application server stores at a storage device subscriber service data comprising a description of the application service feature enabled for the communication device.

6. The primary serving call session control function device of claim 5, wherein the storage device operates in a home subscriber server, wherein the secondary application server retrieves the subscriber service data from the home subscriber server and enables the application service feature responsive to receiving a notification from the home subscriber server when the primary application server updates the subscriber service data stored in the home subscriber server, and wherein the primary application server retrieves the subscriber service data from the home subscriber server and enables the application service feature of the secondary application server responsive to receiving a notification from the home subscriber server when the secondary application server updates the subscriber service data stored in the home subscriber server.

7. The primary serving call session control function device of claim 1, wherein the processor further performs operations comprising:
receiving a session initiation protocol message generated by the communication device, wherein the session initiation protocol message comprises an application service feature; and
transmitting the session initiation protocol message to the primary application server, wherein the primary application server
enables the application service feature,
identifies the secondary application server, and
notifies the secondary application server of an application service feature requested by the communication device.

8. The primary serving call session control function device of claim 1, wherein the processor further performs:
transmitting to a proxy call session control function device or to an interrogating call session control function device information identifying the secondary communication resource.

9. The primary serving call session control function device of claim 1, wherein the processor further performs:
receiving an identity of the secondary serving call session control function device from a home subscriber server.

10. The primary serving call session control function device of claim 1, wherein the primary serving call session control function device and the secondary serving call session control function device are located in remote sites, and wherein the communication device comprises a portable wireless communication device capable of long-range or short-range wireless communications with the internet protocol multimedia subsystem network or a landline communication device tethered to the internet protocol multimedia subsystem network.

11. A proxy call session control function device, comprising:
a memory to store instructions; and
a processor coupled to the memory, wherein responsive to executing the instructions, the processor performs operations comprising:
receiving a registration request from a communication device;
transmitting the registration request to a primary serving call session control function device communicatively coupled to a primary application server, wherein the primary serving call session control function device and the primary application server operate collectively as a primary communication resource for the communication device; and
receiving information regarding a secondary serving call session control function device communicatively coupled to a secondary application server;
subsequently detecting a communication fault in the primary communication resource; and
establishing communication services with a secondary communication resource responsive to the detected communication fault,
wherein the secondary serving call session control function device and the secondary application server operate collectively as the secondary communication resource for providing backup communication services, the secondary communication resource being available to provide the backup communication services prior to and separate from detection of the communication fault, wherein the secondary communication resource provides the backup communication services without an additional registration process.

12. The proxy call session control function device of claim 11, wherein the operations further comprise:
detecting a call initiated by the communication device;
transmitting a session initiation protocol message to the primary communication resource to process the call; and
detecting the communication fault when the primary communication resource fails to respond to the session initiation protocol message within a time period.

13. The proxy call session control function device of claim 12, wherein the communication fault is identified by a session initiation protocol 408 message, a session initiation protocol 503 message, or a lack of response from the primary communication resource.

14. The proxy call session control function device of claim 11, wherein the operations further comprise:
transmitting a session initiation protocol message to the primary communication resource to determine a state of operation of the primary communication resource; and
detecting the communication fault when the primary communication resource fails to respond to the session initiation protocol message within a time period.

15. The proxy call session control function device of claim 14, wherein the communication fault is identified by a session initiation protocol 503 message or a lack of response from the primary communication resource.

16. The proxy call session control function device of claim 11, wherein the operations further comprise:

transmitting a session initiation protocol message to the primary communication resource;

retransmitting the session initiation protocol message when the primary communication resource fails to respond to the session initiation protocol message within a time period; and detecting the communication fault when a number of retransmissions of the session initiation protocol message exceeds a threshold.

17. The proxy call session control function device of claim 11, wherein the operations further comprise establishing communication services with the secondary communication resource without informing the communication device.

18. An interrogating call session control function device, comprising:

a memory to store instructions; and a processor coupled to the memory, wherein responsive to executing the instructions, the processor performs operations comprising:

receiving a request from a serving control session control function device communicatively coupled to a first communication device to establish communications with a second communication device responsive to the first communication device initiating a call directed to the second communication device;

identifying a primary serving call session control function device to which the second communication device is registered;

receiving information regarding a secondary serving call session control function device providing backup communication services to the second communication device;

subsequently detecting a communication fault when attempting to communicate with the primary serving call session control function device; and establishing communications with the secondary serving call session control function device responsive to detecting the communication fault, wherein the secondary serving call session control function device is available to provide the backup communication services prior to and separate from detection of the communication fault, wherein the secondary serving call session control function device provides the backup communication services without an additional registration procedure.

19. The interrogating call session control function device of claim 18, wherein the operations further comprise:

receiving information from a home subscriber server; and identifying the secondary serving call session control function device from the information.

20. The interrogating call session control function device of claim 18, wherein the processor is adapted to establish communication services with the secondary serving call session control function device without informing the first communication device.

21. A backup serving call session control function device communicatively coupled to a backup application server, wherein the backup serving call session control function device and the backup application server operate collectively as a backup communication resource available to a communication device communicatively coupled to an internet protocol multimedia subsystem network, the backup serving call session control function device comprising:

a memory to store instructions; and a processor coupled to the memory, wherein responsive to executing the instructions, the processor performs operations comprising:

receiving registration information associated with the communication device, where the communication device is registered with a primary communication resource; and transmitting a registration message to the backup application server to enable backup services for the communication device, wherein the operations are performed in a registration procedure for the communication device so that the backup communication resource is available in response to a subsequent detection of a communication fault, wherein the backup serving call session control function device is available to provide the backup services prior to and separate from detection of the communication fault, wherein the backup serving call session control function device provides the backup services without an additional registration procedure.

22. The backup serving call session control function device of claim 21, wherein the operations further comprise receiving the registration information from a primary serving call session control function device of the primary communication resource.

23. The backup serving call session control function device of claim 21, wherein the backup application server is synchronized with a primary application server of the primary communication resource.

24. The backup serving call session control function device of claim 23, wherein the backup application server is synchronized with the primary application server by sharing subscriber service data at a storage device.

25. The backup serving call session control function device of claim 23, wherein the backup application server is synchronized with the primary application server by establishing communication between the primary application server and the backup application server.

* * * * *